United States Patent [19]

Fujihira et al.

[11] Patent Number: 5,449,901

[45] Date of Patent: Sep. 12, 1995

[54] FINE SURFACE OBSERVING APPARATUS

[75] Inventors: Masamichi Fujihira, 2000-10-3-404 Kosugaya-cho, Sakae-ku, Yokohama-shi, Kanagawa; Tatsuaki Ataka; Hiroshi Muramatsu, both of Tokyo, all of Japan

[73] Assignees: Seiko Instruments Inc.; Masamichi Fujihira, Japan

[21] Appl. No.: 95,968

[22] Filed: Jul. 22, 1993

[30] Foreign Application Priority Data

Jul. 28, 1992 [JP] Japan .................................. 4-201101

[51] Int. Cl.[6] ............................................. G01N 21/17
[52] U.S. Cl. .................................... 250/234; 250/306; 250/227.26; 250/227.11
[58] Field of Search ................. 250/306, 307, 227.26, 250/234, 227.11, 216; 359/368, 385

[56] References Cited

U.S. PATENT DOCUMENTS

| 4,917,462 | 4/1990 | Lewis et al. | 359/368 |
| 5,105,305 | 4/1992 | Betzig | 359/368 |
| 5,264,698 | 11/1993 | Kopelman et al. | 250/307 |
| 5,286,971 | 2/1994 | Betzig et al. | 250/227.26 |
| 5,304,795 | 4/1994 | Fujihira et al. | 250/306 |

OTHER PUBLICATIONS

Science, vol. 247, 5 Jan. 1990, Lancaster, Pa. pp. 59-61, K. Lieberman et al., "A Light Source Smaller Than the Optical Wavelength".
D. W. Pohl, *Advances in Optical and Electron Microscopy*, 1990, vol. 12, Academic Press, London, GB, pp. 243-312, "Scanning Near-Field Microscopy".
APS News, vol. 1, No. 3, Mar. 1992, New York, N.Y., pp. 26-27, A. Lewis, "Lensless Imaging Beyond the Diffraction Limit".
Nature, vol. 354, Nov. 21, 1991, London, GB, pp. 214-216, A. Lewis et al., "Near-field optical imaging with a non-evanescently excited high-brightness light source of sub-wavelength dimensions".
Science, vol. 257, 10 Jul. 1992, Lancaster, Pa., pp. 189-195, E. Betzig et al., "Near-Field Optics:Microscopy, Spectroscopy, and Surface Modification Beyond the Diffraction Limit".
Journal of Luminescence, vol. 1, 2, 1970, Amsterdam, NL, pp. 693-701, K. H. Drexhage, "Influence of a Dielectric Interface on Fluorescence Decay Time".

*Primary Examiner*—Jack I. Berman
*Assistant Examiner*—James Beyer
*Attorney, Agent, or Firm*—Adams & Wilks

[57] ABSTRACT

An optical scan type tunnel microscope based on a new principle, having higher resolution, is provided. The apparatus of the invention is comprised of at least an optical fiber 3 whose head portion is covered by an energy acceptor 6, a prism on which a sample which contains an energy donator 7 or is covered by the energy donator 7 is placed, a XY-axis transfer mechanism 9, XY-axis control mechanism 10, Z-axis transfer mechanism 11, Z-axis control mechanism 12, light source 13, optical system 14, and an optical detecting system 15.

29 Claims, 2 Drawing Sheets

FINE SURFACE OBSERVING APPARATUS

BACKGROUND OF THE INVENTION

The present invention relates generally to an optical apparatus and, more particularly, to an optical scan-type tunnel microscope applying an energy transfer phenomenon.

Conventionally, a structure of an optical scan-type tunnel microscope shown in FIG. 2 is described for example in "The Optics" vol. 20, No. 3, pp. 134–141. The microscope includes an optical fiber 8 having a core portion 3 and a clad portion 4. The end surface of the clad portion 4 is covered by a light shielding film 5. At an end of the core portion 3, there is a head portion which is smaller in size than a wavelength of light. The microscope further comprises a Z-axis transfer mechanism 11 and a control mechanism 12 for causing the surface of a sample 2 to be measured to fully approach and to be positioned at the head portion of the optical fiber, and an XY-axis transfer mechanism 9 and a control mechanism 10 for causing the head portion of the optical fiber to scan the surface of the sample 2. The microscope further comprises a prism 1 for leading in light so that the light totally reflects on the surface of the sample, a light source 13 and an optical system 14 for generating the illuminating light, and a light detecting system 15 for measuring light which is a part of evanescent light generated on the outside of the surface of the sample under the aforementioned condition of total reflection and which passes to the other end of the optical fiber by infiltrating through the optical fiber from the head portion thereof.

As it is apparent from the aforementioned document, the optical scan-type tunnel microscope is able to measure a structure such as an irregularity on the surface of a sample in a resolution that exceeds by far a resolution of about a wavelength in optical microscopes which are restricted by the limitation of the diffraction of light, by utilizing the evanescent light whose amplitude attenuates exponentially and by an optical probe having a fine opening within a distance of about a wavelength in a normal direction on the surface of the sample.

However, the resolution of the optical scan-type tunnel microscope has been low as compared to that of a scan-type tunnel microscope because the exponential attenuation of the amplitude of the evanescent light along with the increase of distance from the sample surface is slow as compared to an attenuation of a tunnel current flowing between a fine conductive needle and a sample in the scan-type tunnel microscope, and because the sensitivity for detecting light is lowered due to the reduction in diameter of the aperture which significantly lowers the possibility for the evanescent light to infiltrate into the optical fiber.

On the other hand, although a sample of the scan-type tunnel microscope needs to be conductive, a sample of the optical scan-type tunnel microscope just needs to be transparent and needs not be conductive. As the optical scan,type tunnel microscope has such a merit, there has been a demand to enhance its resolution by any means.

SUMMARY OF THE INVENTION

It is an object of the present invention to solve such problems of the prior art by providing an optical scan-type tunnel microscope which has a higher resolution than that of conventional optical scan-type tunnel microscopes and which utilizes a new principle employing a physical phenomenon related to a light that changes more rapidly than the exponential attenuation of amplitude of the evanescent light along with the increase of the distance from the sample surface and, as a result, infiltrates into the optical fiber effectively.

In order to solve the aforementioned problems, the invention is able to display an image of a shape on the sample surface or spatial distribution of an energy donator within the sample or on the sample surface by covering a sharp head portion of an optical fiber with an energy acceptor and by measuring the intensity of light passing through the optical fiber which is generated as the proximity of the sample surface, which contains the energy donator or whose surface is covered by the energy donator, is scanned under illumination of the light.

DETAILED DESCRIPTION OF THE PREFERRED EMBODIMENT

Figure 1:
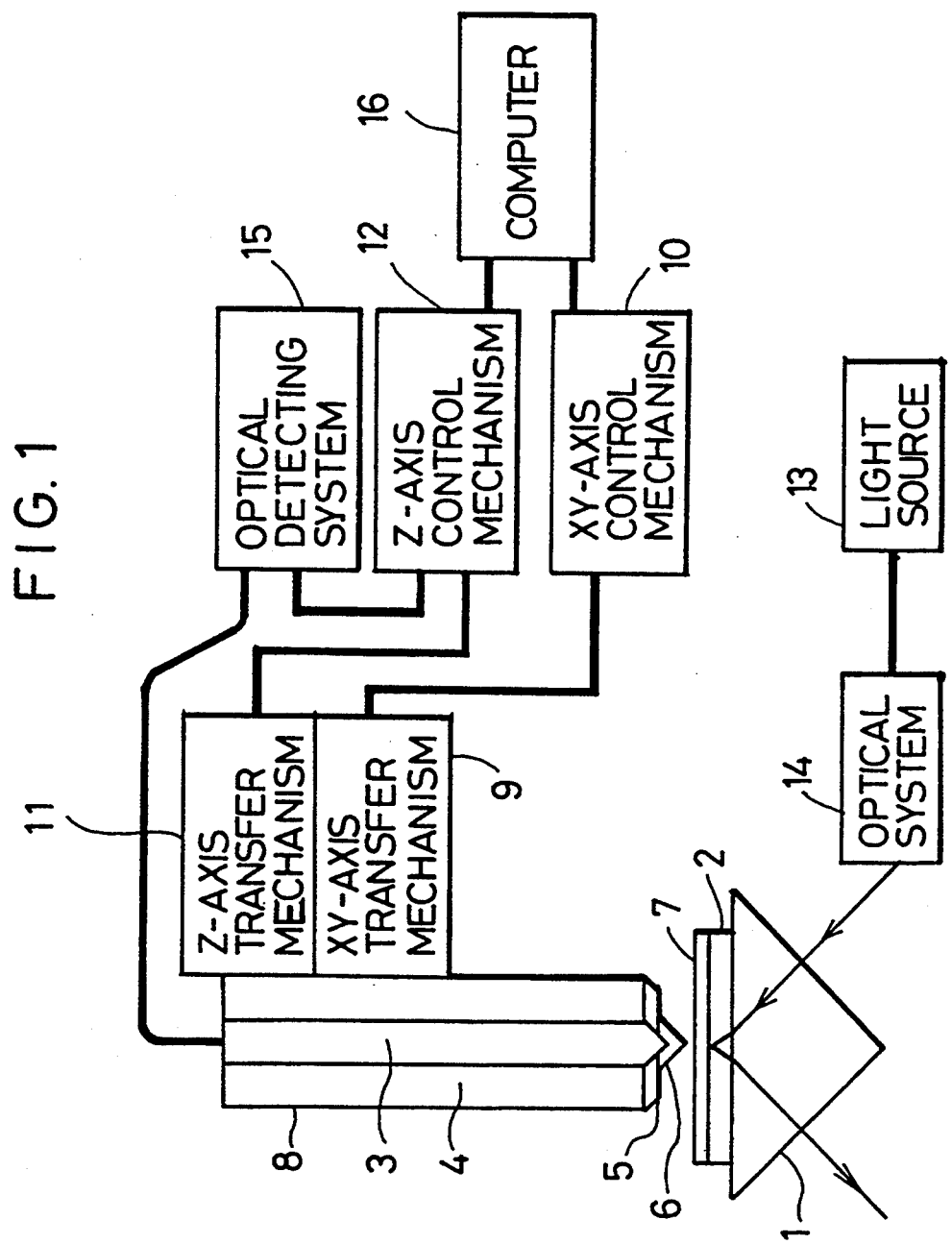
FIG. 1 shows an optical scan-type apparatus using an energy donator and energy acceptor according to the present invention.
Figure 2:
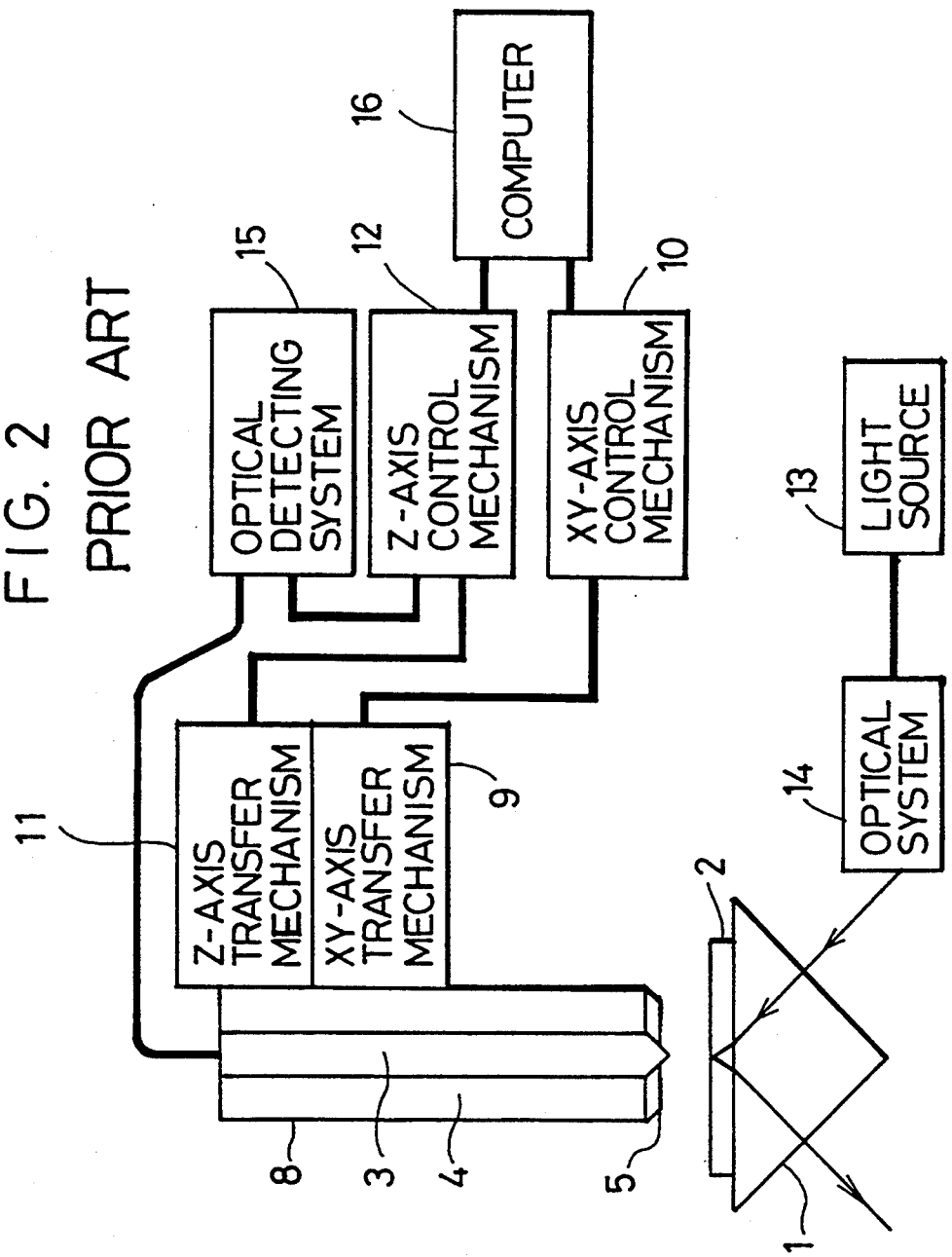
FIG. 2 shows a conventional optical scan-type tunnel microscope.

FIG. 1 shows a preferred embodiment of an optical scan-type apparatus using an energy donator and energy acceptor according to the present invention.

As shown in FIG. 1, the apparatus includes an optical fiber 8 having a core portion 3 and a clad portion 4. The end surface of the clad portion 4 is covered by a light shielding film 5. At the end of the core portion 3, there is a sharp head portion having a small opening which is smaller than a wavelength of light. The apparatus further comprises a Z-axis transfer mechanism 11 and a control mechanism 12 for causing the surface of a sample 2 to be measured to fully approach and to be positioned at the head portion of the optical fiber, and an XY-axis transfer mechanism 9 and a control mechanism 10 for causing the head portion of the optical fiber to scan the surface of the sample. The apparatus further comprises a transparent substrate or prism 1 for supporting the sample 2 and for leading in light so that the light totally reflects on the surface of the sample, a light source 13 and an optical system 14 for generating the illuminating light, and a light detecting system 15 for measuring light which is a part of evanescent light generated on the outside of the surface of the sample under the aforementioned condition of total reflection and which passes to the other end of the optical fiber by infiltrating through the optical fiber from the head portion thereof.

In this embodiment, the head portion of the optical fiber 8 is covered by an energy acceptor 6, and the sample surface is covered by an energy donator 7.

The apparatus is able to display an image of a shape on the sample surface 2 or spatial distribution of the energy donator 7 within the sample or on the sample surface by covering the sharp head portion of the optical fiber 8 with the energy acceptor 6, by measuring the intensity of light passing through the optical fiber which is generated as the proximity of the sample surface, which contains the energy donator 7 or whose surface is covered by the energy donator 7, and is scanned under illumination of the light, and (A) by displaying a means for automatically controlling the distance between the head portion of the optical fiber and the sample surface, corresponding to a photoelectric current measured and a spatial coordinate of the head portion of the optical fiber, in a graph, or (B) by displaying changes in photoelectric currents measured when the XY plane is scanned while fixing the position of the Z-axis of the head portion of the optical fiber in a graph.

In another embodiment, the head portion of the optical fiber may be covered so that more than two kinds of energy acceptors form a laminated structure in order to guide the emission more effectively from the energy acceptors to the optical fiber.

Further, in order to create a more accurate image of the shape of the sample surface, it is possible to cover the sample surface with a monomolecular film of an energy donator of an organic pigment.

Any compound, beside the aforementioned organic compound, may be used for the energy acceptor and energy donator as long as the one selected provides the aforementioned functions.

Furthermore, when the Z-axis transfer mechanism 11 and control mechanism 12 for causing the surface of the sample to be measured to fully approach and to be positioned at the head portion of the optical fiber 8 and the XY-axis transfer mechanism. 9 and control mechanism 10 for causing the head portion of the optical fiber to scan the sample surface are used, either the optical fiber or the sample can be moved since the positional relationship between the two is relative.

Light may be illuminated on the sample surface through the optical fiber or through the space between the optical fiber and the sample surface, instead of introducing the light so that it totally reflects on the sample surface. In this case, the head portion of the optical fiber is covered by an energy acceptor and the sample surface is covered by an energy donator. Thus, instead of measuring the light which is a part of the evanescent light generated on the outside of the sample surface under the condition of total reflection and which is infiltrated into the optical fiber from the head portion thereof and arrives at the other end of the optical fiber, the light which arrives at the other end of the optical fiber may be measured by separating it into the illumination light illuminated and the emission from the energy acceptor by causing it to pass through the optical fiber or to pass through the space between the optical fiber and the sample surface.

In another embodiment of the present invention, it is possible to cover the head portion of the optical fiber by an energy donator and to cover the sample surface by an energy acceptor, or to cause it to contain the energy acceptor, and instead of leading in the illumination of light so that the light totally reflects on the sample surface, the energy donator on the head portion of the optical fiber is illuminated through the optical fiber or through the space between the optical fiber and the sample surface. In this case, instead of measuring the light which is a part of evanescent light generated on the outside of the sample surface under the condition of total reflection and which infiltrates into the optical fiber from the head portion of the optical fiber and arrives at the other end of the optical fiber, a means for measuring the light is provided on the backside of the sample to be measured, separating the light into the illuminated light and the emission from the sample surface.

In the optical scan-type tunnel microscope constructed as described above utilizing energy transfer, a higher resolution may be obtained due to that (a) the efficiency of energy transfer between the energy donator excited by the illumination and the energy acceptor in a ground state changes sharply corresponding to the increase of a fine distance between them and that (b) because the energy transfer is caused by an interaction between molecules, it effectively advances even through a very narrow space and it is possible to give a directionality to the energy transfer by arranging more than two energy acceptors in a laminated structure or using a natural antenna compound to cause to emit from the energy acceptors in excited state again in the fully extended optical fiber section to lead into the optical fiber.

That is, it becomes possible to measure the irregularity on the sample surface or the spatial distribution of energy donators in higher resolution by measuring sharp changes in the intensity of light to the distance through the optical fiber which is generated at the proximity of the surface of the sample containing an energy donator or the surface of the sample covered by an energy donator, and by displaying an image of the sample surface from the in-plane change of the photoelectric current detected or by scanning within the plane so that the distance from the sample surface to the sharp head portion of the optical fiber is kept constant with a precision of less than 1 nm utilizing the sensitive distance dependency of the photoelectric current.

Measured examples of the invention will be explained below.

(Measured Example 1)

At first, a flat surface of an oblique line of a rectangular prism was covered with a molecular film of N,N'-dioctadecyl oxacyanin pigment, which is an energy donator, and a fine head portion of an optical fiber obtained by etching processing was covered with a monomolecular film of N,N'-dioctadecyl thiacyanin pigment, which is an energy acceptor.

Then when a distance dependency of the intensity of evanescent light from the surface was measured by illuminating a light from a semiconductor laser having a long wavelength of 800 nm, which was longer than the absorbing band of the energy acceptor so that it would totally reflect on the surface of the oblique line of the prism, and the head portion of the optical fiber was moved to approach the illuminated surface, the light attenuated exponentially in a range of 1 nm to 50 nm, similarly to the result reported in the aforementioned document (the "Optics").

On the other hand, the photoelectric current sharply reduced in a range of 5 nm and 15 nm from the surface when only the emission from the acceptor was measured by illuminating an ultraviolet light around 370 nm which is absorbed by the energy donator but is not absorbed by the energy acceptor under the same condition of total reflection, by causing the head portion of the optical fiber to approach again the illuminated surface and by separating the illuminated light and the emission from the donator using a filter.

(Measured Example 2)

A fine head portion of an optical fiber obtained by etching processing was covered with a monomolecular film of N,N'-dioctadecyl thiadicarbocyanin pigment as a first energy acceptor and then was covered with a monomolecular film of N, N'-dioctadecyl thiacyanin pigment as a second energy acceptor.

Thereafter, when an emission spectrum was measured by a high sensitive fluorescent photometer by causing the fine head portion of the optical fiber covered by the first and second monomolecular films of energy acceptors to approach the ultraviolet illuminated plane of the oblique line of the prism covered by the monomolecular film of N, N'-dioctadecyl oxacyanin pigment, which is an energy donator, and by separating the illuminated light and the emission from the donator among the lights passed through the fiber using a filter, mainly an emission spectrum from the first acceptor was observed. Thereafter, when only the emission from the first acceptor was measured by separating the illuminated light and the emission from the donator and second acceptor among lights passed through the fiber using a filter, the photoelectric current sharply reduced in a range of 5 nm and 15 nm from the surface.

(Measured Example 3)

When, in the experiment of the first measured example, the illumination light was applied to the sample surface on the oblique line of the prism through the optical fiber using a branching filter and the emission from the acceptor caused by the energy transfer was detected through the optical fiber separating it from the illumination light using the branching filter, instead of illumination under the condition of total light reflection through the prism, the similar distance dependency of the intensity of light as that in the measured example 1 was obtained.

The present invention has an effect of enhancing resolution more than conventional optical scanning microscopes because it utilizes the energy transfer which is a physical phenomenon and which attenuates more sharply than the exponential attenuation of amplitude of evanescent light with the increase of the distance from the sample surface as described above.

Further, the present invention has an effect of simplifying the conventional optical scan-type apparatus and facilitating an adjustment of a sample because the same energy transfer phenomenon may be actively used either by inputting light in a gap between the end of the optical fiber and the sample or by inputting light by means of the evanescent light generated when the light is totally reflected.

Furthermore, the present invention also has an effect of allowing to readily retrieve the spatial distribution of the energy acceptor on the sample surface since it uses the energy donator on the edge of the optical fiber and it is possible to input from the optical fiber side.

What is claimed is:

1. An optical scan-type apparatus comprising: a sample to be observed; an energy donator disposed on the sample; a transparent substrate for supporting the sample; an optical fiber having a head portion at one end thereof, the head portion having an opening; an energy acceptor disposed on the head portion; light means for directing an incident light toward the sample to excite the energy donator and the energy acceptor; an optical detecting system for detecting and separating the incident light from a light emitted from the energy acceptor; a Z-axis transfer mechanism for positioning the head portion of the optical fiber and the sample proximate one another in a z direction; an XY-axis transfer mechanism and an XY-axis control mechanism for producing relative scanning movement between the head portion of the optical fiber and the sample in an x-y plane of the sample; and a Z-axis control mechanism responsive to control signals for controlling the z-axis transfer mechanism to maintain a constant distance between the sample and the head portion of the optical fiber during relative scanning motion between the head portion of the optical fiber and the sample.

2. An optical scan-type apparatus according to claim 1; wherein the light means comprises means for directing light at an angle onto one of a top surface and a bottom surface of the sample.

3. An optical scan-type apparatus according to claim 1; wherein the light means comprises means for directing light through the optical fiber toward the transparent substrate and onto the sample.

4. An optical scan-type apparatus according to claim 1; wherein at least two layers of energy acceptors are disposed on the head portion of the optical fiber.

5. An optical scan-type apparatus according to claim 1; wherein the transparent substrate comprises an optical prism.

6. An optical scan-type apparatus comprising: a sample to be observed; an energy acceptor disposed on the sample; a transparent substrate for supporting the sample; an optical fiber having a head portion at one end thereof, the head portion having an opening; an energy donator disposed on the head portion; light means for directing an incident light toward the sample to excite the energy donator and the energy acceptor; an optical detecting system for detecting and separating the incident light from a light emitted from the energy acceptor; a Z-axis transfer mechanism for positioning the head portion of the optical fiber and the sample proximate one another in a z direction; an XY-axis transfer mechanism and an XY-axis control mechanism for producing relative scanning movement between the head portion of the optical fiber and the sample in an x-y plane of the sample; and a Z-axis control mechanism responsive to control signals for controlling the z-axis transfer mechanism to maintain a constant distance between the sample and the head portion of the optical fiber during relative scanning motion between the head portion of the optical fiber and the sample.

7. An optical scan-type apparatus according to claim 6; wherein the light means comprises means for directing light at an angle onto one of a top surface and a bottom surface of the sample.

8. An optical scan-type apparatus according to claim 6; wherein the light means comprises means for directing light through the optical fiber toward the substrate and onto the sample.

9. An optical scan-type apparatus according to claim 6; wherein at least two layers of energy acceptors are disposed on the sample.

10. An optical scan-type apparatus according to claim 6; wherein the transparent substrate comprises an optical prism.

11. An optical scan-type system comprising: an optical fiber having a head portion; a sample to be observed; an energy donator disposed on one of the optical fiber head portion and the sample; an energy acceptor disposed on the other one of the optical fiber head portion and the sample; support means for supporting the sample; positioning means for positioning the head portion and the sample proximate one another in a z direction; means for producing relative scanning movement between the head portion and the sample in an x-y plane of the sample; and means for measuring the distance in the z direction between the head portion and the sample and for controlling the positioning means to maintain a constant distance between the head portion and the sample.

12. An optical scan-type system according to claim 11; further comprising optical means for visually monitoring the position of the head portion of the optical fiber with respect to the sample.

13. An optical scan-type system according to claim 11; wherein the energy acceptor is disposed on the head portion of the optical fiber and the energy donator is disposed on the sample.

14. An optical scan-type system according to claim 13; further comprising light means for directing light onto the sample; and optical means for visually monitoring the position of the head portion of the optical fiber with respect to the sample and for detecting a light emitted by the energy acceptor.

15. An optical scan-type system according to claim 14; wherein the support means comprises a transparent substrate.

16. An optical scan-type system according to claim 15; wherein the light means comprises means for directing light at an angle onto one of an upper surface and a lower surface of the sample.

17. An optical scan-type system according to claim 15; wherein the transparent substrate comprises an optical prism.

18. An optical scan-type system according to claim 14; wherein the light means comprises means for directing light through the optical fiber toward the support means and onto the sample.

19. An optical scan-type system according to claim 13; wherein at least two layers of energy acceptors are disposed on the head portion of the optical fiber.

20. An optical scan-type system according to claim 13; wherein the energy acceptor comprises a monomolecular film of N, N'-dioctadecyl thiacyanin pigment; and the energy donator comprises a monomolecular film of N, N'-dioctadecyl oxacyanin pigment.

21. An optical scan-type system according to claim 11; wherein the energy donator is disposed on the head portion of the optical fiber; and the energy acceptor is disposed on the sample.

22. An optical scan-type system according to claim 21; further comprising light means for directing a light onto the sample; and optical means for visually monitoring the position of the head portion of the optical fiber with respect to the sample and for detecting light emitted by the energy acceptor.

23. An optical scan-type system according to claim 22; wherein the support means comprises a transparent substrate.

24. An optical scan-type system according to claim 23; wherein the light means comprises means for directing light at an angle onto one of an upper surface and a lower surface of the sample.

25. An optical scan-type system according to claim 23; wherein the transparent substrate comprises an optical prism.

26. An optical scan-type system according to claims 22; wherein the light means comprises means for directing light through the optical fiber toward the support means and onto the sample.

27. An optical scan-type system according to claim 21; wherein at least two layers of energy acceptors are disposed on the sample.

28. An optical scan-type system according to claim 21; wherein the energy acceptor comprises a monomolecular film of N, N'-dioctadecyl thiacyanin pigment; and the energy donator comprises a monomolecular film of N, N'-dioctadecyl oxacyanin pigment.

29. A method for optically scanning a surface, comprising: disposing one of an energy acceptor and an energy donator on a head portion of an optical fiber; disposing the other one of the energy acceptor and the energy donator on a surface to be scanned; positioning the head portion proximate the surface; directing a light at the surface to excite the energy donator and the energy acceptor; producing relative scanning motion between the head portion and the surface; and detecting a light emitted by the energy acceptor during the scanning motion to produce an image of the surface.

* * * * *